United States Patent [19]

Burgio, Jr.

[11] Patent Number: 5,003,185

[45] Date of Patent: Mar. 26, 1991

[54] SYSTEM AND METHOD FOR PHOTOCHEMICALLY CURING A COATING ON A SUBSTRATE

[76] Inventor: Joseph T. Burgio, Jr., 705 Jennings St., Bethlehem, Pa. 18017

[21] Appl. No.: 272,763

[22] Filed: Nov. 17, 1988

[51] Int. Cl.[5] .................... G01J 1/00

[52] U.S. Cl. .................... 250/504 R; 250/494

[58] Field of Search .................... 250/494, 504 R, 503, 250/492.1

[56] References Cited

U.S. PATENT DOCUMENTS

| | | | |
|---|---|---|---|
| 3,026,435 | 3/1962 | McPherson | 250/504 R |
| 3,733,709 | 5/1973 | Bassemir et al. | 250/504 R |
| 3,950,650 | 4/1976 | Pray et al. | 250/504 R |
| 4,015,340 | 4/1977 | Treleven | 250/504 R |
| 4,019,062 | 4/1977 | Rongren | 250/504 R |
| 4,048,916 | 9/1977 | Silverman | 250/504 R |
| 4,596,935 | 6/1986 | Lumpp | 250/504 R |
| 4,798,960 | 1/1989 | Keller et al. | 250/504 R |

*Primary Examiner*—Bruce C. Anderson
*Attorney, Agent, or Firm*—Joseph J. O'Keefe; Charles A. Wilkinson

[57] ABSTRACT

A system for curing a photosensitive coating on a moving substrate comprises a dual-fluid cooled reflector block and ultraviolet lamp assembly, first and second intermediate pressure blowers connected in series, a heat exchanger, refrigerating device connected in an appropriate manner to the reflector-block lamp assembly and a computer. The reflector block has a cavity with a reflective surface, a channel extending longitudinally of, and open to, the cavity for a substantial portion of its length and both an air and a water conduit extending longitudinally of the block. The lamp is mounted within the reflective block cavity and the air conduit connects through ports with the cavity channel. A temperature sensing device positioned within the reflector-block cavity continually monitors the temperature and transmits signals applicable thereto to a computer which is connected to the elements of the system to control their operation and the circulation of coolant water through the reflector-block and the passage of coolant air to and from such block channel and over the lamp to maintain it within a prescribed temperature range.

18 Claims, 3 Drawing Sheets

SYSTEM AND METHOD FOR PHOTOCHEMICALLY CURING A COATING ON A SUBSTRATE

FIELD OF THE INVENTION

This invention relates to an improved system and method for photochemically curing a heat-sensitive coating on a moving substrate. More particularly the system and method are applicable to curing of a heat sensitive coating on a moving substrate so as to minimize problems related to heating and provide apparatus of reduced size for use in presses where only a very limited amount of space is available, at one or more locations, for a curing system.

BACKGROUND OF THE INVENTION

In the printing industry there is a trend toward operating presses at higher and higher speeds and with a variety of different coatings for application on moving substrates. It is recognized that one of the variables for curing such coatings is the application of ultraviolet radiation. Too little ultraviolet radiation, of course, requires a longer curing time, and an excessive amount of heat, which is a byproduct of mercury vapor lamps used for ultraviolet radiation, may create warping and distortion of the coating on the substrate, and contribute, under certain conditions, to fire and equipment problems. The most common device for such heating or curing purposes is a medium pressure mercury vapor ultraviolet lamp which operates at about two atmospheres of pressure and at about 300 watts per inch, although such lamps may operate between 200 to 400 watts per inch. Such lamps typically have an operating temperature of between about 1100° F. to 1500° F. and are used in conjunction with reflectors which direct the ultraviolet light toward the coated substrate that is to be cured. Lamp-reflector assemblies require cooling to operate most effectively and with a minimum of problems, and the cooling must be accomplished under different press operating conditions.

Air, alone or with water, is the usual medium for cooling lamp reflector assemblies. Most commonly air for cooling such assemblies is provided by low pressure, large-volume blowers which operate between about ⅛ to ½ psi. and provide between about 350 to 1500 cfm. The large-volume blowers generate large amounts of air which must be exhausted from the presses and further create large amounts of undesirable ozone which also must be exhausted in a controlled manner from the vicinity of the presses. Occasionally, air for cooling is supplied from a plant compressed air system which has a blower that operates at high pressure and low volume, i.e. about 60 to 80 psi. or higher, and at about 8 to 10 cfm. High pressure air directed through small ports at ultraviolet lamps causes non-uniform cooling of the lamp-reflector assemblies. While both such types of blowers are not restricted in size as they are mounted away from the press equipment, both the low pressure, large volume blower and the high pressure, low volume blower require lamp-reflector assemblies of such a size that they cannot be installed, reasonably, either between the stands of a multi-stand press or in the delivery section thereof, without extensive and expensive modifications to the press equipment.

OBJECTS OF THE INVENTION

It is a main object of the invention to provide a system for curing a coating on a substrate moving through a multi-stand press, which includes curing apparatus that is of a size that can be readily mounted within such a press and can be cooled in a controlled manner by air and water circulated therethrough by equipment mounted external of the press.

Another object is to provide a method for operating such a system in a controlled manner such that the system effectively reacts to variations in press conditions and controls the operation of the press lamp-reflector assembly within prescribed temperature ranges.

SUMMARY OF THE INVENTION

An object of the invention is accomplished by a system for curing a coating on a substrate moving through a multi-stand press. The curing is accomplished by means of ultraviolet radiation from a mercury vapor lamp-reflector assembly mounted within the limited confines of the press. The assembly comprises an elongated reflector-block, which has a cavity with a parabolic trough reflective surface, and an ultraviolet lamp mounted within the cavity. The reflector-block includes a longitudinally extending channel at the apex of the cavity, a water conduit and an air conduit A plurality of ports connect the air conduit with the reflector-block channel A water pump circulates water to and from the reflector-block water conduit for cooling purposes. First and second intermediate pressure blowers connected in series convey pressurized air to a heat exchanger, which is connected to a refrigerating device, and then sequentially to the reflector-block air conduit, ports and channel from where it is discharged to flow over the ultraviolet lamp and block reflective surface A temperature measuring device positioned within the reflector-block cavity transmits temperature variations adjacent the ultraviolet lamp to a computer The computer is connected to the blowers, refrigerating device and heat exchanger and functions to modify the operations thereof in accordance with the temperature transmitted to the computer by the temperature measuring device whereby the system reacts to variations in press conditions and controls the lamp-reflector assembly in a manner to operate within a prescribed temperature range.

In another variation of the invention the objectives are accomplished by a method of operating the system described above in the following manner. The temperature of an ultraviolet lamp for curing the coating on a moving substrate and mounted within the cavity of a reflector-block is controlled within a prescribed temperature range by continuously monitored temperatures adjacent the lamp. Changes in temperature transmitted to a computer control device initiate, in a staged manner, the operation of first and second blowers, a heat exchanger and refrigerating device to reduce the temperature of pressurized air delivered to the reflector-block and discharged therefrom over and around the lamp to maintain its operation within a prescribed temperature range. Water in a controlled manner is also circulated through the reflector-block for cooling purposes and provide a stabilizing reference point for the temperature devices.

BRIEF DESCRIPTION OF THE DRAWINGS

The nature of the invention will be more clearly understood by reference to the following description, the appended claims and the several views illustrated in the accompanying drawings

DESCRIPTION OF THE PREFERRED EMBODIMENT

Figure 1:
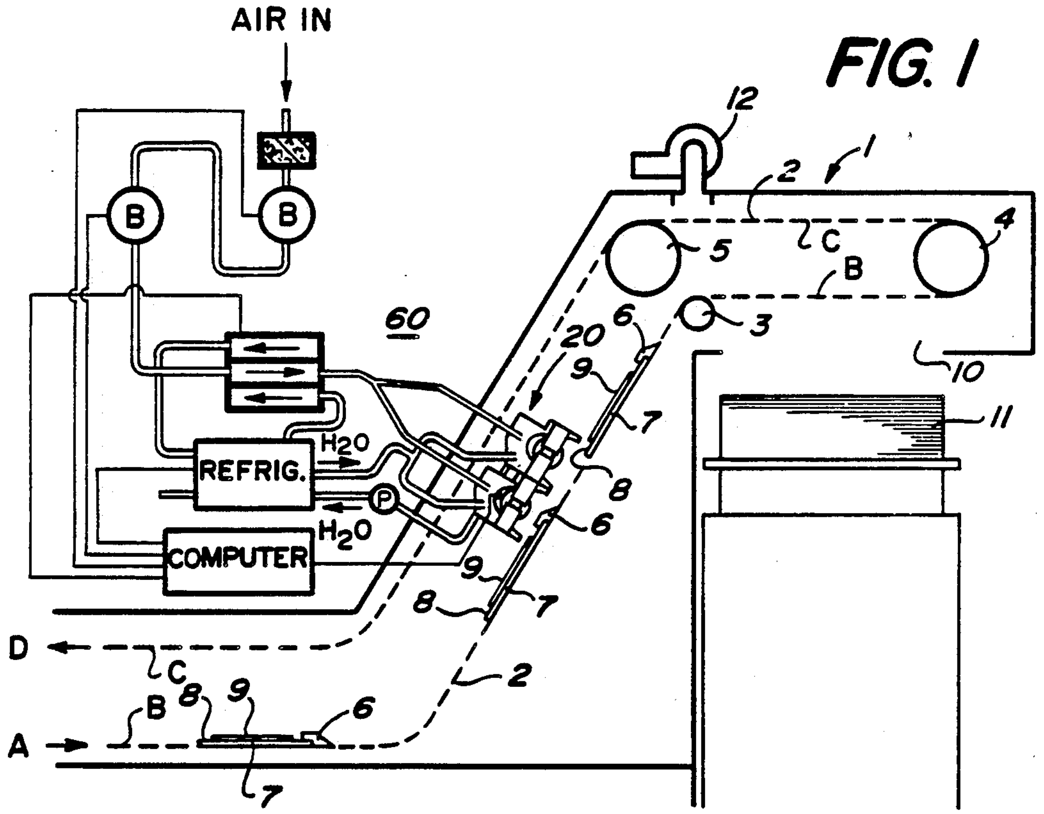
FIG. 1 is a schematic cross-sectional view of the delivery section of the end of a multi-stand, multi-color, sheet-fed printing press through which a coated substrate is passed for the purpose of drying the coating by means of the system and method of this invention
Figure 7:
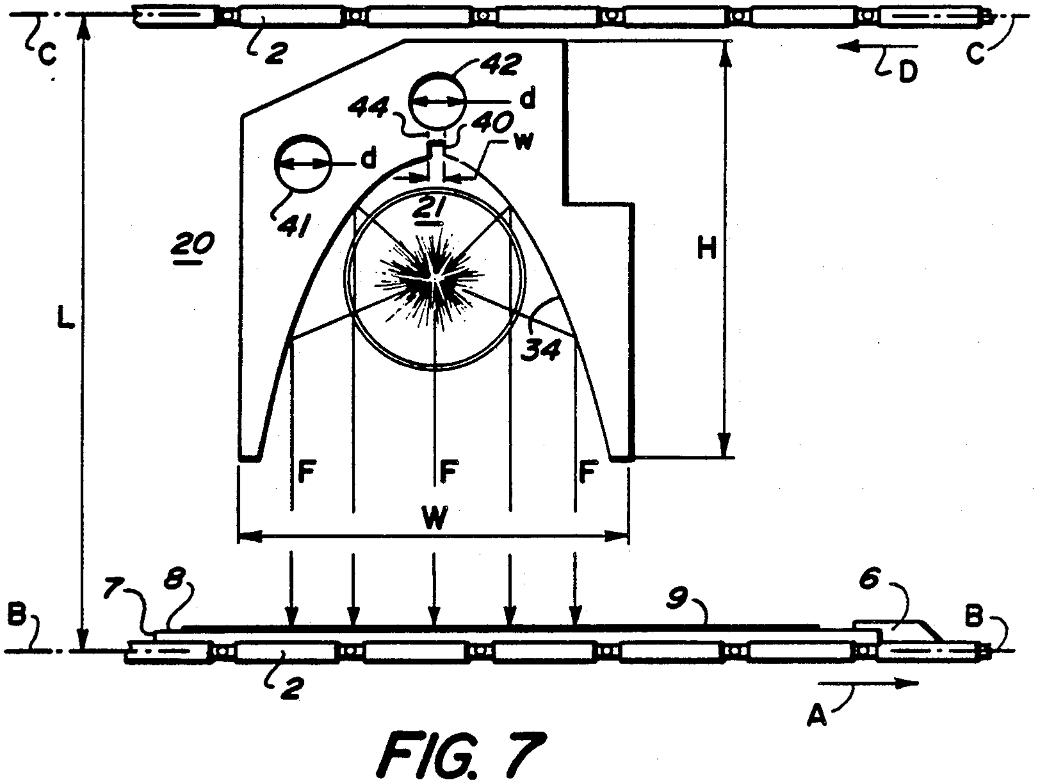
FIG. 7 is an enlarged schematic view, similar to FIG. 3, showing the limited space in which the lamp-reflector assembly of the system of the invention can be installed and the manner in which ultraviolet rays are reflected by the lamp-reflector assembly of the system of this invention.

Referring to FIG. 1 there is shown the delivery section 1 at the end of a multi-stand, multi-color, sheet-fed printing press, not shown, capable of handling coated sheets having a width of approximately 40 inches at a speed of between about 300 to 550 feet per minute Feed chain 2, shown in greater detail in FIG. 7, moves from the multi-stand section of the press, not shown, in the direction of arrow A along bottom pass line B. Chain 2 continues along the bottom pass line B, upwardly and over guide roller 3 around drive sprocket 4, where it reverses direction. Chain 2 then travels along upper pass line C, over sprocket 5 and downwardly and from delivery section 1 in the direction of arrow D and returns to the multi-stand section of the press.

Spaced along chain 2 are a plurality of releasable clamps 6 that engage the leading edges of sheets 7 which rest on chain 2. On the upper surface 8 of each sheet 7 is a thin coating 9 of ink or chemical that has been placed on surface 8 during the passage of sheets 7 through the multi-stand section of the press. After each sheet 7 passes over guide roller 3, clamps 6 which engage the leading edge of the sheet release, and it drops through delivery section opening 10 onto the top of a stack 11 of sheets 7 from where they can be moved subsequently to a desired location. Exhaust blower 12 continuously removes hot air from the interior of delivery section 1.

As sheets 7 resting on feed chain 2 travel through delivery section 1 along bottom pass lane B, they move beneath one or more ultraviolet lamp-reflector assemblies 20, two as shown in FIG. 1. As best shown in FIGS. 2 through 5, each lamp assembly 20 includes elongated tubular, medium-pressure mercury vapor ultraviolet lamp 21, a line source of light, having a central portion 22 in which there is formed an arc, shown in FIG. 7, that emits radiation, and end portions 23 and 24. Wires 25 and 26 of end portions 23 and 24, respectively, of lamp 21 are connected to a suitable power source, not shown, for energizing lamp 21. Lamp end portions 23 and 24 are mounted in refractory insulators 27 and 28, respectively, secured to opposite ends of elongated reflector-block 30.

Figure 2:
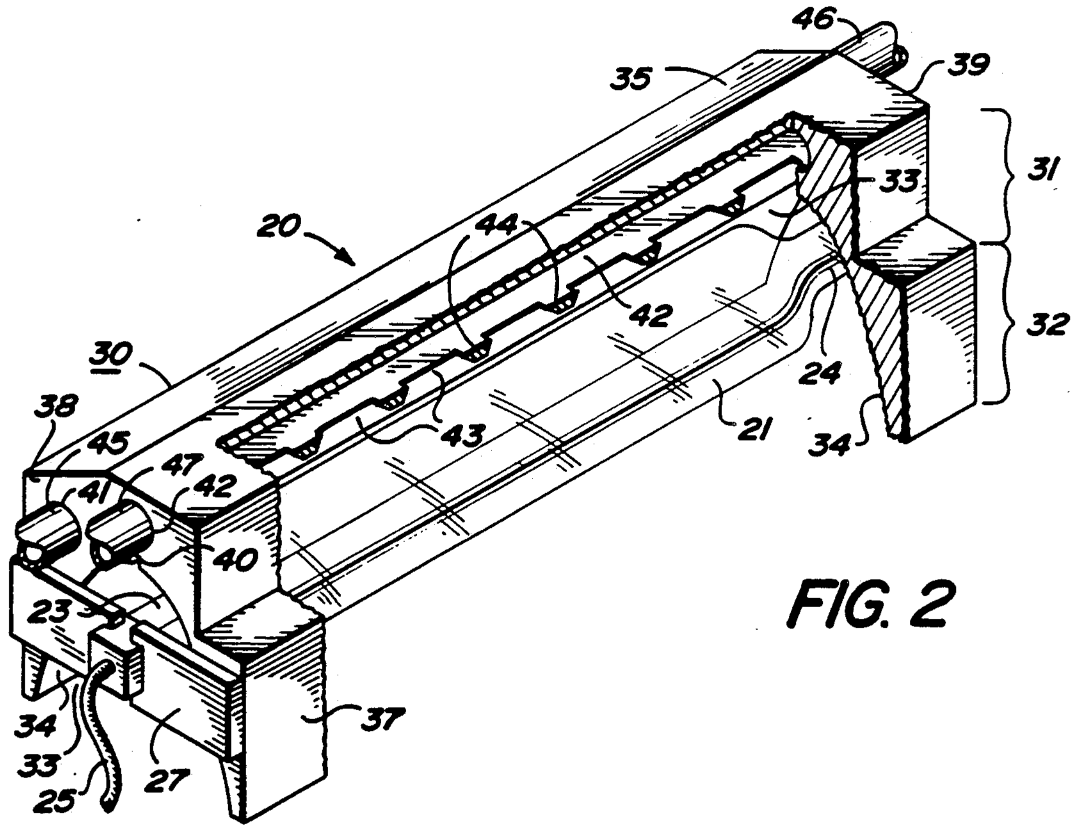
FIG. 2 is an isometric view of a lamp-reflector assembly of the apparatus of FIG. 1.

As shown in FIG. 2, reflector-block 30, which is made of extruded aluminum, has an upper portion 31 and a lower portion 32 and a cavity 33 in the shape of a parabolic trough having a reflective surface 34. As shown in FIGS. 2-5, reflector-block 30 has a top 35, side 36, stepped side 37 and ends 38 and 39. At the apex of reflective surface 34 is channel 40 that extends longitudinally of block 30 from end 38 to end 39. Channel 40 has an inverted gutter or U-shape with its bottom open to cavity 33 for substantially its length. Extending longitudinally of block 30, from end 38 to end 39, are water conduit 41 and air conduit 42. Water conduit 41 is positioned in the upper portion 31 of block 30, between reflective surface 34 and block top 35 and side 36. Air conduit 42 is positioned in the upper portion 31 of block 30, between channel 40 and top 35. A plurality of longitudinally extending ports 43, separated by narrow ribs 44, connect channel 40 with conduit 42.

Figure 3:
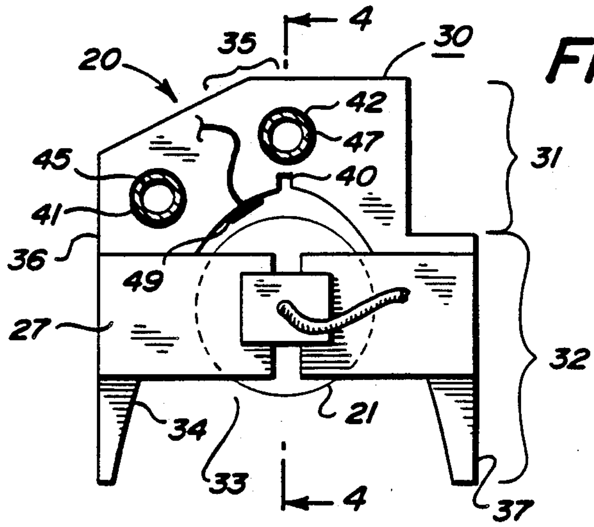
FIG. 3 is an end view of the lamp reflector assembly of FIG. 2.
Figure 4:
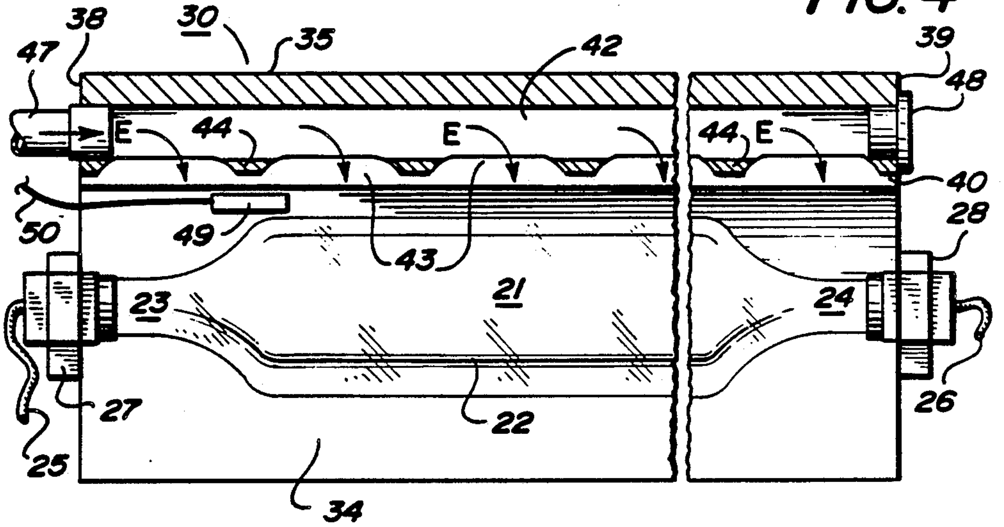
FIG. 4 is a cross-section taken through the line 4—4 of FIG. 3 looking in the direction of the arrows 4—4.
Figure 5:
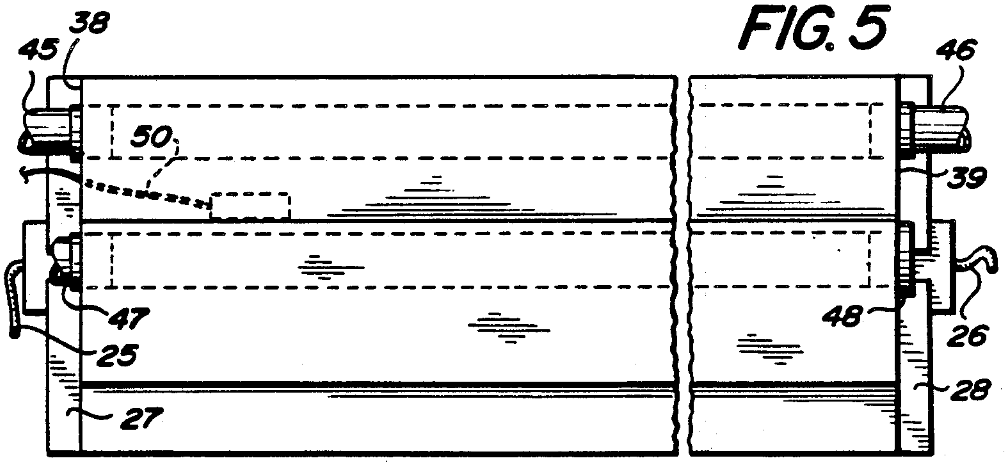
FIG. 5 is a plan view of the lamp reflector assembly of FIG. 2.

As shown in FIGS. 2, 4 and 5, connected to water conduit 41 at reflector-block end 38 is water inlet tubing 45, and at reflector-block end 39 is water discharge tubing 46. Connected to air conduit 42 at reflector-block end 38 is air inlet tubing 47. Air conduit 42 is closed by plug 48 at reflector-block end 39. As shown in FIGS. 3-5, secured to block reflective surface 34, a distance of about 1 inch from channel 40 and spaced about 4 inches from block end 38 is temperature sensing device 49, such as a thermocouple or thermistor, from which wires 50 extend.

Figure 6:
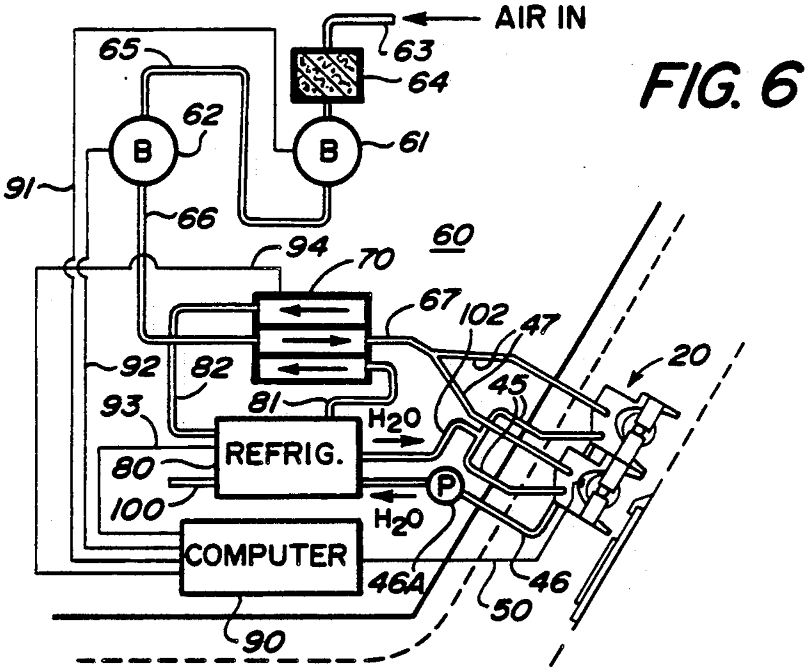
FIG. 6 is an enlarged fragmentary view of FIG. 1 showing the system of the invention in greater detail, including the air, water, refrigerating and computer control apparatus.

As best shown in FIG. 6, cool, i.e. refrigerated, air and water is supplied to lamp-reflector assemblies 20 by means of air-water system 60. System 60 includes intermediate pressure blowers 61 and 62, which are connected in series, heat exchanger 70, refrigerating device 80 and computer control device 90. Air is supplied to blower 61 through air inlet tubing 63 and air filter 64. In blower 61 the air is pressurized and its temperature elevated somewhat before being discharged through connecting tube 65 to blower 62 where the air is further pressurized and its temperature again elevated. The pressurized, heated air then passes through tube 66 to and through a first side of shell and tube heat exchanger 70 where the pressurized air is cooled as hereinafter described As shown in FIGS. 4 and 6, the cooled pressurized air then passes through cooled air discharge line 67 to air inlet tubing 47 and to air conduit 42 of each lamp assembly 20 The cooled, pressurized air passes into air conduit 42 and discharges through ports 43 and reflector-block channel 40, at between about $\frac{1}{4}$ to $\frac{1}{2}$ cfm. per linear inch of length, as shown in FIG. 4 by arrows E, over and around lamp 21 to uniformly cool it and maintain its temperature within a prescribed operating range, i.e. between about 1100° F. to 1500° F.

As shown in FIG. 6, the pressurized heated air passing through one side of heat exchanger 70 has its temperature lowered by coolant that circulates from refrigerating device 80 through coolant tube 81 to a second side of heat exchanger 70 where the coolant extracts heat from the pressurized air in the first side thereof. The coolant at a higher temperature exits heat exchanger 70 and returns through coolant tube 82 to refrigerating device 80 where the temperature of the coolant is lowered in a manner well known to those skilled in the art.

As shown in FIGS. 2, 5 and 6, each reflector-block 30 is also cooled by water circulated in a closed loop through refrigerating device 80, water feed tube 102 and water inlet tubing 45, water conduit 41 and water discharge tubing 46 of each such block back to refrigerating device 80. Circulation is accomplished by water pump 46A connected to discharge tube 46. Water is initially provided to the closed loop through water supply tube 100, from a source not shown, which connects to refrigerating device 80 and a water feed tube therein but not shown. Any replenishment of water is provided in the same manner. The cooled water passing through water conduit 41 of each reflector block 30 acts to maintain its temperature within a prescribed operating range of between about 50° F. to 80° F., preferably about 65° F. In passing through reflector-block 30, the water temperature rises and it returns through water discharge tubing 46 and pump 46A to refrigerating device 80 where the water is recooled.

In another variation of the invention the objectives are accomplished by a method of operating the above described system in the following manner.

At the time of starting a multi-stand press ahead of delivery section 1, pump 46A operates to circulate water through reflector-block 30 to bring it within a reference temperature of between about 45° F. to 75° F., preferably about 50° F. Temperature sensing device 49, connected to computer control device 90, continually monitors the temperature within the vicinity of its position adjacent block reflective surface 34 and lamp 21, and when that temperature exceeds 75° F. computer control device 90 through line 93 starts refrigerating device 80 to cool the water circulating through device 80.

When desired the press operator strikes lamp 21, i.e. turns on the power, initiating an arc within its central portion 22, and lamp 21 reaches full power in about 2 minutes. As the lamp continues operation and grows hotter the temperature in the vicinity thereof and adjacent reflector-block 40 rises and the continually rising temperatures are communicated by temperature sensing device 49 to computer control device 90. When the temperature reaches between 140° F. to 160° F., computer control device 90 through line 91 starts intermediate pressure blower 61 which draws air through air inlet tube 63 and filter 64 and compresses it to a pressure of between about ½ psi. to 1 psi. and increases the temperature thereof. For example, if the air to blower 61 has an ambient temperature of about 70° F., the temperature of the pressurized air increases to about 90° F. Pressurized air from blower 1 circulates through the appropriate tubing through intermediate pressure blower 62, which is inactive, heat exchanger 70, which is also inactive, to reflector-block 30 where the air passes into air conduit 42 and is discharged through ports 43 and channel 40 over lamp 21 and reflective surface 34 of such block.

Even as the pressurized air from blower 61 is discharged over lamp 21, its operating temperature continues to increase, as do the temperatures monitored by sensing device 49. When the temperature communicated to computer control device 90 by sensing device 49 rises to between about 450° F. to 550° F., control device 90 through line 92 starts intermediate pressure blower 62 connected in series with blower 61. Blower 62 through tube 65 receives pressurized heated air from blower 61 and further compresses it to a pressure between about 1.5 psi. to 1.75 psi., further increasing its temperature. The further pressurized and hotter air circulates through heat exchanger 70, which remains inactive, and to reflector-block 30 in the manner described in the preceding paragraph. The air discharged from blower 62 has a temperature of between about 90° F. to 130° F., preferably about 110° F.

When the temperature communicated by temperature sensing device 49 to computer control device 90 rises to between about 650° F. to 750° F., control device 90, through line 93 starts refrigerating device 80 which circulates coolant through line 81, heat exchanger 70 and coolant return tube 82 back to device 80. The heated and pressurized air passing through a first side of heat exchanger 70 is cooled by the passage of coolant from refrigerating device 81 circulated through the second side of heat exchanger 70 in a manner to decrease the temperature of the pressurized air between about 30° F. to 50° F. The heated, pressurized air passing through heat exchanger 70 is cooled to a temperature between about 50° F. to 80° F., preferably about 60° F. and passes to and from reflector-block 30 through channel 40 and over the surface of lamp 21 and block reflective surface 34 to cool those elements.

The preferred embodiment of the system described above and its method of operation is used in conjunction with a press that is programmed to operate at four different stages of power, in ¼, ½, ¾ or full power and computer control device 90, responding to temperatures communicated to it from temperature sensing device 49, functions to activate blower 61, blower 62, refrigerating device 80 and heat exchanger 70 in the manner described above. Other dryer systems incorporated in commercial presses do not operate in the 4-stage manner described above and operate only at ½ or full power. At startup of such other presses the cooling air blower is started at approximately the same time that the lamp arc is struck, and the air, at times, tends to over-cool the lamp and cause the arc to extinguish. Because of such early cooling present commercially available ultraviolet systems require between about 3 to 5 minutes for the ultraviolet lamp to reach full power.

In the delivery sections of commercial sheet-fed presses space is limited and the distance small between the bottom and upper pass lines of the chain normally used for transporting the printed sheets through the presses. Consequently, in presses currently in service, any equipment to be retrofitted into such sections must be small and function well enough to do its job. If large equipment is used, the pass lines of the chain must be spread, which involves a major and costly modification of the delivery section. In addition, the commercial pressure to operate presses at higher speeds sometimes can be satisfied only by placing additional drying equipment between the stands of a multi-stand press, locations where space is also at a premium.

In FIG. 7 is illustrated a manner in which the lamp reflector assembly 20 of the preferred system described above may be installed between the bottom pass line B and the upper pass line C of chain 2. In many presses the distance L between such pass lines may be only between about 3 inches to 6 inches. By virtue of the air and water cooling of the lamp-reflector assembly 20 it can be manufactured with an overall height H of between about 2¾ inches to 3¼ inches, with a width W of between about 2 inches to 3½ inches. In a lamp-reflector assembly 20 with such dimensions, channel 40 may have a width w between about 3/64 inch to 9/64 inch, preferably about 1/16 inch, and water conduit 41 and air conduit 42 each may have a diameter d between about $\frac{3}{8}$ inch to $\frac{3}{4}$ inch. The diameter of lamp 21 may be between about $\frac{3}{4}$ inch to 1 3/16 inches. The length of lamp 21 governs the length of reflector-block 30, channel 40 and ports 43. It is important that channel 40 have a length at least equal to the central portion 22 of lamp 21 to ensure adequate cooling of the central portion. Preferably elongated channel 40 should be at least as long as the overall length of lamp 21, i.e. including lamp end 23, central portion 22 and end 24 to ensure that the ends of the lamp receive adequate cooling. One of the advantages of the elongated channel 40 is that the pressurized air passing therefrom flows over and around lamp 21 to cool the surface thereof in a uniform manner The arrows F in FIG. 7 illustrate the manner in which rays reflect in a parallel manner from parabolic trough reflective surface 34.

Blowers 61 and 62 have been identified as intermediate pressure blowers An intermediate pressure blower is one that operates at a pressure of about $\frac{1}{2}$ to 4 psi. with an output of between about 50 to 420 cfm. One blower meeting such requirements is a regenerative blower made by Gast Manufacturing Corp. of Benton Harbor, Mich. This blower has blades only at the periphery of the impeller and as the blower impeller rotates, centrifugal force moves air from the root of the blade to the blade tip. Upon leaving the blade tip the air flows around the impeller housing contour back to the root of the succeeding blade where the flow pattern is repeated. This action provides a quasi-staging effect to increase pressure differential capability. In the preferred embodiment described above computer control device 90 is an open board computer manufactured by Analog Device, Inc of Norwood, Mass. Refrigerating device 80 includes a condensing unit manufactured by Copeland Corporation of Sidney, Ohio. Heat exchanger 70 is a shell and tube heat exchanger manufactured by Trantor Division of ITT Corporation.

Reflector-block 30 is of extruded aluminum which provides adequate strength to support an ultraviolet lamp, which has a length of up to 60 inches and operates at a temperature of 1100° F., without sagging and damaging the lamp. While the preferred embodiment of reflector-block 30 includes a plurality of ports 43 separated by ribs 44, there can be one single port having a length approximately equal to that of channel 40. Ribs 44 strengthen and provide rigidity for reflector block 30 and prevent it from sagging and deteriorating under the high operating conditions of lamp 21.

While the system of this invention and its method of operation have been described above in a preferred manner, the description has been simplified by avoiding reference to detailed piping, valving and controls that are inherent in any such system and well known to those skilled in the art. It is also recognized that reflective surface 34 that has been described as a parabolic trough reflective surface, can be made in a variety of shapes. It is further recognized that modifications and variations can be made by those skilled in the art to the above described system and method without departing from the spirit and scope thereof as defined in the appended claims.

I claim:

1. A single fluid-cooled reflector-block with an ultraviolet lamp for curing a coating on a moving substrate, said reflector-block having:
   (A) a cavity with a reflective surface for reflecting rays from said lamp to said coating for curing thereof, (B) a channel extending longitudinally of said cavity and having an opening to said cavity for a substantial portion of the length thereof,
   (C) a first conduit extending through said reflector-block and connecting with at least a major portion of said channel whereby a first cooled fluid delivered to said first conduit passes to and from said channel to cool the reflective surface of said cavity and said lamp.

2. The apparatus of claim 1 wherein said reflector-block cavity has a parabolic trough reflective surface and said reflector-block channel extends longitudinally adjacent the apex of said reflective surface.

3. The apparatus of claim 2 wherein said reflector-block has a second conduit extending longitudinally thereof for circulation of a second cooled fluid through said reflector block for cooling thereof.

4. A single, fluid-cooled reflector-block with an ultraviolet lamp for curing a coating on a substrate moving through a press having a restricted height clearance of between 3 inches to 6 inches, said reflector-block having:
   (A) a height between about $2\frac{1}{4}$ inches to $3\frac{1}{4}$ inches,
   (B) a cavity with a reflective surface for reflecting rays from said lamp to said coating for curing thereof,
   (C) a channel extending longitudinally of said cavity and having an opening to said cavity for a substantial portion of the length thereof,
   (D) a first conduit extending through said reflector-block, and
   (E) at least one port connecting said conduit with said channel whereby a first cooled fluid delivered to said first conduit 5. The apparatus of claim 4 wherein said reflector-block has a width between about 2 inches to $3\frac{1}{2}$ inches and said channel has a width between about 3/64 to 9/64 inch.

6. Apparatus for curing a coating on a moving substrate comprising:
   (A) a single, cooled reflector-block having:
      (1) a longitudinally extending cavity having a reflective surface,
      (2) a channel extending longitudinally of said cavity and having an opening to said cavity for a substantial portion of the length thereof,
      (3) a first conduit extending through said reflector-block and connecting with a major portion of said channel;
   (B) ultraviolet light source means within said reflector-block cavity for directing ultraviolet rays to said coating for curing thereof,
   (C) gas blower means connected to said reflector-block first conduit and said reflector-block channel whereby gas from said blower passes through said reflector-block first conduit, out of said reflector-block channel and over said cavity reflective-surface and said ultraviolet light source means for cooling thereof.

7. The apparatus of claim 6 wherein said light source has a central portion, said channel has a length at least equal to the length of said light source central portion and said gas blower means is an intermediate pressure gas blower means.

8. The apparatus of claim 6 wherein said reflector-block has a parabolic trough reflective surface and said reflector-block channel extends longitudinally adjacent the apex of said reflective surface.

9. The apparatus of claim 6 wherein said reflector-block has a second conduit extending therethrough and further includes pump means for circulating liquid through said second conduit for cooling of said reflector-block.

10. Apparatus for curing a coating on a moving substrate comprising:

(A) a reflector-block having:
(1) a longitudinally extending cavity having a reflective surface,
(2) a channel extending longitudinally of said cavity reflective surface,
(3) a conduit extending through said reflector-block and connecting with a major portion of said channel;
(B) ultraviolet light source means mounted within said reflector-block cavity;
(C) cooling means;
(D) gas blower means connecting with said cooling means, and said reflector-block conduit;
(E) temperature sensing means within said reflector-block cavity spaced from said light source means for measuring the temperature adjacent thereto;
(F) control means connected with said temperature sensing means, said gas blower means and said cooling means and responsive to variations of temperature within said reflector-block cavity and communicated to said control means by said temperature sensing means, whereby gas from said gas blower means passing to said reflector-block and out said channel into said reflector-block cavity is cooled to maintain the temperature of said ultraviolet light source means within a prescribed temperature range.

11. The apparatus of claim 10 wherein said reflector-block has a second longitudinally extending conduit and further includes a pump to circulate a liquid coolant through said second

12. The apparatus of claim 11 wherein said gas blower means is an intermediate pressure gas blower means.

13. Apparatus for curing a coating on a moving substrate comprising:

(A) an elongated reflector-block having:
(1) a cavity with a reflective surface,
(2) a channel extending longitudinally of said cavity,
(3) a first conduit extending through said reflector-block and connecting with a major portion of said channel,
(4) a second conduit extending through said reflector-block;
(B) ultraviolet light source means within said reflector-block cavity;
(C) cooling means;
(D) first gas blower means having:
(i) a gas inlet, and
(ii) gas discharge;
(E) second gas blower means having:
(i) a gas inlet connected with the gas discharge of said first gas blower means, and
(ii) a gas discharge connecting with said cooling means, said reflector-block conduit, and said reflector-block channel;
(F) temperature sensing means within said reflector-block cavity and spaced from said light source means for measuring the temperature adjacent thereto;
(G) pump means for circulating liquid to and from said reflector-block second conduit to cool said reflector-block;
(H) control means connected with said temperature sensing means, said first intermediate gas blower means and said cooling means and responsive to variations of temperature within said reflector-block cavity communicated to said control means by said temperature sensing means, whereby said control means function to send pressurized gas from said first intermediate gas blower means through said cooling means and to said reflector-block first conduit and from said channel connected therewith to said reflector-block cavity to cool said ultraviolet light source means and said reflector-block reflective surface.

14. The apparatus of claim 13 wherein said reflector-block has a height of between about $2\frac{1}{4}$ inches and 3174 inches and said reflector-block cavity has a parabolic trough reflective surface.

15. The apparatus of claim 13 wherein said ultraviolet light source means is mounted longitudinally of said reflector-block cavity and said reflector-block channel has a length at least equal to the length of a central portion of said light source means.

16. The apparatus of claim 13 wherein said control means also is connected to said second gas blower means, whereby said control means functions to send pressurized gas from said first and second gas blower means through said cooling means and to said reflector-block first conduit and from said channel connected therewith to said reflector-block cavity to cool said ultraviolet light source means and said reflector-block reflective surface.

17. Apparatus for curing a coating on a moving substrate comprising:

(A) an elongated reflector-block having:
(1) a longitudinally extending cavity with a reflective surface,
(2) a channel extending longitudinally of said cavity,
(3) a first conduit extending through said reflector-block,
(4) at least one port connecting said channel with said first conduit,
(5) a second conduit extending through said reflector-block;
(B) ultraviolet light source means within said reflector-block cavity;
(C) cooling means;
(D) heat exchanger means;
(E) first gas blower means having:
(i) a gas inlet, and
(ii) a gas discharge,
(F) second gas blower means having
(i) a gas inlet connected with the gas discharge of said first gas blower means, and
(ii) a gas discharge connected with said heat exchanger means, said reflector-block first conduit, port and channel;
(G) temperature sensing means extending within said reflector-cavity and spaced from said light source means for measuring the temperature adjacent thereto;

(H) pump means for circuiting liquid to and from reflector-block second conduit to cool said reflector-block;

(I) control means connected with said temperature sensing means, said first and second gas blower means, said cooling means and said heat exchanger means and responsive to variations of temperature within said reflector-block cavity communicated to said control means by said temperature sensing means, whereby said control means functions to send pressurized gas from said first and second blower means through said heat exchanger means and to said reflector-block first conduit, port and channel for discharge therefrom into said reflector-block cavity to cool said ultraviolet light source means and said reflector block.

18. The apparatus of claim 17 wherein said reflector-block has a height of between $2\frac{1}{4}$ inches and $3\frac{1}{4}$ inches and said reflector-block channel has a width between about 3/64 inch to 9/64 inch.

* * * * *

UNITED STATES PATENT AND TRADEMARK OFFICE

CERTIFICATE OF CORRECTION

PATENT NO. : 5,003,185

DATED : MARCH 26, 1991

INVENTOR(S) : JOSEPH T. BURGIO, JR.

It is certified that error appears in the above-identified patent and that said Letters Patent is hereby corrected as shown below:

Col. 2, line 31, place a period after the word "channel".

Col. 2, line 38, place a period after the word "surface".

Col. 2, line 41, place a period after the word "computer".

Col. 4, line 50, place a period after the word "described".

Col. 7, line 5, "1 3/16 inches" should read --1-3/16 inches-- there should be a dash between 1 and 3.

Col. 7, line 21, place a period after the word "blowers--.

Claim 1, line 3, "(B)" should be indented and brought out under the section entitled (A).

Claim 4, line 36, after "conduit" add the following: --passes through said port to and from said channel to cool the reflective surface of said cavity and said lamp.--

UNITED STATES PATENT AND TRADEMARK OFFICE
CERTIFICATE OF CORRECTION

PATENT NO. : 5,003,185

DATED : MARCH 26, 1991

INVENTOR(S) : JOSEPH T. BURGIO, JR.

It is certified that error appears in the above-identified patent and that said Letters Patent is hereby corrected as shown below:

Claim 14, lines 21 and 22, "3174 inches" should read --3-1/4 inches--.

Claim 17, line 59, "(F)" should be brought out to the margin under category (E).

Signed and Sealed this

Fifteenth Day of September, 1992

*Attest:*

DOUGLAS B. COMER

*Attesting Officer*

*Acting Commissioner of Patents and Trademarks*